US011630677B2

(12) United States Patent
Guzik

(10) Patent No.: US 11,630,677 B2
(45) Date of Patent: Apr. 18, 2023

(54) DATA AGGREGATION WITH SELF-CONFIGURING DRIVERS

(71) Applicants: Getac Technology Corporation, Taipei (TW); WHP Workflow Solutions, Inc., North Charleston, SC (US)

(72) Inventor: Thomas Guzik, Edina, MN (US)

(73) Assignees: WHP Workflow Solutions, Inc., North Charleston, SC (US); Getac Technology Corporation, Taipei (TW)

(*) Notice: Subject to any disclaimer, the term of this patent is extended or adjusted under 35 U.S.C. 154(b) by 200 days.

(21) Appl. No.: 17/107,714

(22) Filed: Nov. 30, 2020

(65) Prior Publication Data

US 2022/0171632 A1 Jun. 2, 2022

(51) Int. Cl.
*G06F 9/00* (2006.01)
*G06F 9/445* (2018.01)
*G06N 20/00* (2019.01)
*G06F 16/901* (2019.01)
*G06F 9/4401* (2018.01)

(52) U.S. Cl.
CPC ........ *G06F 9/4451* (2013.01); *G06F 16/9017* (2019.01); *G06N 20/00* (2019.01); *G06F 9/4401* (2013.01)

(58) Field of Classification Search
CPC .... G06F 9/4451; G06F 16/9017; G06N 20/00
USPC .......................................................... 713/1
See application file for complete search history.

(56) References Cited

U.S. PATENT DOCUMENTS

| 6,760,744 | B1 | 7/2004 | Halaas et al. |
| 7,917,888 | B2 | 3/2011 | Chong et al. |
| 8,452,722 | B2 | 5/2013 | Naeve et al. |
| 8,606,844 | B2 | 12/2013 | Kaufman et al. |
| 8,688,320 | B2 | 4/2014 | Faenger |
| 9,110,774 | B1* | 8/2015 | Bonn .................. B60W 50/085 |
| 9,264,678 | B2 | 2/2016 | Nuyttens et al. |

(Continued)

FOREIGN PATENT DOCUMENTS

| CN | 109671266 B | 11/2020 |
| JP | 2008204219 A | 9/2008 |

(Continued)

OTHER PUBLICATIONS

U.S. Appl. No. 17/107,891, Office Action dated Apr. 1, 2021, 22 pages.

(Continued)

*Primary Examiner* — Volvck Derose
(74) *Attorney, Agent, or Firm* — Han Santos, PLLC

(57) ABSTRACT

A data aggregation implementation includes self-configuring drivers. From the viewpoint of a Network Operation Center (NOC), a plurality of heterogenous content sources provide content that may be of a variety of different types and formats. All of this content must be ingested and stored for retrieval and reporting, analysis, and/or presentation despite many differences in their collection, format, transmission, and quality. In some embodiments, the NOC includes or cooperates with one or more servers to, among other functions, receive content from content sources, request object reflection by the driver of each content source, receive driver attributes in response, and map the metadata of the content for each content source to a universal schema, thereby self-configuring the driver.

20 Claims, 8 Drawing Sheets

(56) References Cited

U.S. PATENT DOCUMENTS

| | | | |
|---|---|---|---|
| 9,449,229 B1 | 9/2016 | Laska et al. | |
| 9,483,732 B1 | 11/2016 | Milakovich | |
| 9,485,474 B2 | 11/2016 | Kim et al. | |
| 9,681,104 B2 | 6/2017 | Billau et al. | |
| 9,723,251 B2 | 8/2017 | Slotky | |
| 9,738,125 B1* | 8/2017 | Brickley | H04L 67/12 |
| 9,755,890 B2 | 9/2017 | Robertson et al. | |
| 9,832,205 B2 | 11/2017 | Santhi et al. | |
| 9,848,312 B2* | 12/2017 | Sundel | H04W 4/021 |
| 9,852,132 B2 | 12/2017 | Chhichhia et al. | |
| 9,886,261 B1 | 2/2018 | Hotchkies | |
| 10,324,773 B2 | 6/2019 | Wing et al. | |
| 10,460,014 B2 | 10/2019 | Lloyd et al. | |
| 10,540,883 B1* | 1/2020 | Keil | G10L 25/51 |
| 10,902,955 B1 | 1/2021 | Federoff et al. | |
| 11,238,290 B2 | 2/2022 | Burns et al. | |
| 2003/0081127 A1 | 5/2003 | Kirmuss | |
| 2003/0095688 A1 | 5/2003 | Kirmuss | |
| 2003/0163512 A1 | 8/2003 | Mikamo | |
| 2003/0208679 A1 | 11/2003 | Vazquez | |
| 2006/0257001 A1 | 11/2006 | Veen et al. | |
| 2008/0147267 A1* | 6/2008 | Plante | G07C 5/008 348/E7.086 |
| 2008/0303903 A1 | 12/2008 | Bentley et al. | |
| 2009/0150017 A1 | 6/2009 | Caminiti et al. | |
| 2009/0210455 A1 | 8/2009 | Sarkar et al. | |
| 2009/0248711 A1* | 10/2009 | Martinez | G06F 16/10 |
| 2009/0284359 A1* | 11/2009 | Huang | B60R 25/24 340/5.2 |
| 2010/0036560 A1 | 2/2010 | Wright | B60R 16/037 701/36 |
| 2010/0144318 A1* | 6/2010 | Cable | H04L 67/306 455/414.2 |
| 2011/0205068 A1 | 8/2011 | Huynh et al. | |
| 2011/0302151 A1 | 12/2011 | Abadi et al. | |
| 2012/0084747 A1 | 4/2012 | Chakradhar et al. | |
| 2013/0039542 A1 | 2/2013 | Guzik | |
| 2013/0344856 A1* | 12/2013 | Silver | H04M 1/72463 455/418 |
| 2013/0347005 A1 | 12/2013 | Lam et al. | |
| 2014/0343796 A1* | 11/2014 | Abuelsaad | B60R 16/037 701/1 |
| 2015/0089019 A1 | 3/2015 | Chou | |
| 2015/0341370 A1 | 11/2015 | Khan | |
| 2016/0042767 A1* | 2/2016 | Araya | H04N 7/188 386/201 |
| 2016/0086397 A1* | 3/2016 | Phillips | B60R 25/252 701/1 |
| 2016/0153801 A1* | 6/2016 | Cho | G06T 11/60 701/431 |
| 2016/0190859 A1 | 6/2016 | Blum et al. | |
| 2016/0248856 A1* | 8/2016 | Kao | H04L 67/12 |
| 2016/0371553 A1* | 12/2016 | Farnham, IV | G08G 1/04 |
| 2016/0378607 A1 | 12/2016 | Kumar et al. | |
| 2017/0011324 A1* | 1/2017 | Truong | G06Q 10/063112 |
| 2017/0048482 A1 | 2/2017 | Drako et al. | |
| 2017/0148027 A1 | 5/2017 | Yu et al. | |
| 2017/0161323 A1 | 6/2017 | Simitsis et al. | |
| 2017/0161409 A1 | 6/2017 | Martin | |
| 2017/0164062 A1 | 6/2017 | Abramov et al. | |
| 2018/0079413 A1* | 3/2018 | Herrero | G06Q 50/30 |
| 2018/0145923 A1 | 5/2018 | Chen et al. | |
| 2018/0285759 A1 | 10/2018 | Wood et al. | |
| 2018/0365909 A1* | 12/2018 | Cheng | H04L 67/12 |
| 2019/0019122 A1* | 1/2019 | Allen | G06Q 50/30 |
| 2019/0026665 A1 | 1/2019 | Caskey et al. | |
| 2019/0043351 A1* | 2/2019 | Yang | G06V 40/103 |
| 2019/0054925 A1* | 2/2019 | Froeschl | B60W 30/182 |
| 2019/0140886 A1 | 5/2019 | Zywicki et al. | |
| 2019/0325354 A1 | 10/2019 | Rajnayak et al. | |
| 2020/0007827 A1 | 1/2020 | Saad et al. | |
| 2020/0072637 A1* | 3/2020 | Guidotti | G01C 21/3461 |
| 2020/0074156 A1 | 3/2020 | Janumpally et al. | |
| 2020/0081899 A1 | 3/2020 | Shapur et al. | |
| 2020/0145620 A1 | 5/2020 | Alcantara et al. | |
| 2020/0151360 A1* | 5/2020 | Zavesky | G06F 21/604 |
| 2020/0172112 A1* | 6/2020 | Kawashima | B60W 50/08 |
| 2020/0211216 A1* | 7/2020 | Hagio | G06T 7/248 |
| 2020/0304854 A1 | 9/2020 | Baumgartner et al. | |
| 2020/0312046 A1 | 10/2020 | Righi et al. | |
| 2020/0351381 A1 | 11/2020 | Lacey et al. | |
| 2021/0076002 A1* | 3/2021 | Peters | H04N 7/152 |
| 2021/0089374 A1 | 3/2021 | Watson et al. | |
| 2021/0133808 A1* | 5/2021 | Chan | B60W 40/09 |
| 2021/0272702 A1 | 9/2021 | Hakami | |
| 2021/0297929 A1 | 9/2021 | Frusina et al. | |
| 2021/0377205 A1 | 12/2021 | Brown et al. | |
| 2022/0014907 A1* | 1/2022 | Boyd | H04W 12/02 |
| 2022/0169258 A1* | 6/2022 | Samarthyam | G08G 1/20 |

FOREIGN PATENT DOCUMENTS

| | | |
|---|---|---|
| KR | 20130010400 A | 1/2013 |
| KR | 20190086134 A | 7/2019 |
| WO | 2010056891 A1 | 5/2010 |

OTHER PUBLICATIONS

U.S. Appl. No. 17/107,764, Notice of Allowance dated May 26, 2022, 26 pages.

U.S. Appl. No. 17/107,785, Office Action dated Jul. 7, 2022, 21 pages.

U.S. Appl. No. 17/107,824, Notice of Allowance dated Jun. 7, 2022, 33 pages.

U.S. Appl. No. 17/107,830, Office Action dated Jun. 7, 2022, 51 pages.

U.S. Appl. No. 17/107,877, Office Action dated Aug. 18, 2021, 40 pages.

U.S. Appl. No. 17/107,891, Final Office Action dated Aug. 5, 2021, 21 pages.

International Patent Application No. PCT/US2021/060890, International Search Report and Written Opinion dated Mar. 21, 2022, 11 pages.

International Patent Application No. PCT/US2021/060892, International Search Report and Written Opinion dated Mar. 21, 2022, 10 pages.

International Patent Application No. PCT/US2021/060893, International Search Report and Written Opinion dated Mar. 21, 2022, 9 pages.

International Patent Application No. PCT/US2021/060894, International Search Report and Written Opinion dated Mar. 21, 2022, 9 pages.

International Patent Application No. PCT/US2021/060895, International Search Report and Written Opinion dated Mar. 21, 9 pages.

International Patent Application No. PCT/US2021/060896, International Search Report and Written Opinion dated Mar. 14, 2022, 11 pages.

Juan Rendon et al. Structural combination of neural network models. 2016 IEEE 16th International Conference on Data Mining Workshops (ICDMW). IEEE Dec. 12, 2016, pp. 406-413. Section II; and figure 2.

Massimo Bonavita et al. Machine Learning for Model Error Inference and Correction. Journal of Advances in Modeling Earth Systems. Nov. 13, 2020, pp. 1-22. Section 2.1; and figure 1.

Md Manjurul Ahsan et al. Deep MLP-CNN Model Using Mixed-Data to Distinguish between COVID-19 and Non-COVID-19 Patients. Symmetry 2020. Sep. 16, 2020, pp. 1-14. Section 2; and figure 3.

U.S. Appl. No. 17/107,708, Office Action dated May 9, 2022, 57 pages.

U.S. Appl. No. 17/107,764, Office Action dated Dec. 8, 2021, 38 pages.

U.S. Appl. No. 17/107,785, Final Office Action dated May 11, 2022, 9 pages.

U.S. Appl. No. 17/107,785, Office Action dated Mar. 29, 2022, 30 pages.

U.S. Appl. No. 17/107,824, Notice of Allowance dated May 2, 2022, 34 pages.

(56) References Cited

OTHER PUBLICATIONS

U.S. Appl. No. 17/107,824, Office Action dated Dec. 29, 2021, 30 pages.
U.S. Appl. No. 17/107,877, Final Office Action dated Dec. 29, 2021, 40 pages.
U.S. Appl. No. 17/107,891, Notice of Allowance dated Nov. 2, 2021, 23 pages.
Van Hiep Phung et al. A High-Accuracy Model Average Ensemble of Convolutional Neural Networks for Classification of Cloud Image Patches on Small Datasets. Applied Sciences 2019. Oct. 23, 2019, pp. 1-16. Section 2; and figure 3.
Xueheng Qiu et al. Ensemble Deep Learning for Regression and Time Series Forecasting. 2014 IEEE Symposium on Computational Intelligence in Ensemble Learning (CIEL). IEEE, Dec. 9, 2014, pp. 1-6.
U.S. Appl. No. 17/1017,785, Notice of Allowance dated Nov. 10, 2022, 26 pages.
U.S. Appl. No. 17/107,708, Final Office Action dated Aug. 19, 2022, 52 pages.
U.S. Appl. No. 17/107,830, Notice of Allowance dated Nov. 9, 2022, 22 pages.
U.S. Appl. No. 17/107,877, Notice of Allowance dated Aug. 22, 2022, 40 pages.
U.S. Appl. No. 17/590,738, Notice of Allowance dated Oct. 5, 2022, 48 pages.

* cited by examiner

DATA AGGREGATION WITH SELF-CONFIGURING DRIVERS

BACKGROUND

Content sources come in a variety of sizes, form factors, ruggedness, and the like, and sometimes includes sensors that are configured to sense innumerable conditions such as images, light, temperature, sound, activity, etc. The content may be converted into, for example, digital data, that can be transmitted for processing in any number of ways by any number of systems to provide information useful for many purposes. Examples of content sources include, but are not limited to, cameras, microphones, motion detectors, heat sensors, documents, and so on.

Information from various content sources, even sources of the same type, may be output for processing in various formats. Provided with a predetermined schema, some of the information can be parsed using a common mask. For information of various formats (and different schema), different masks corresponding to the various formats are used.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
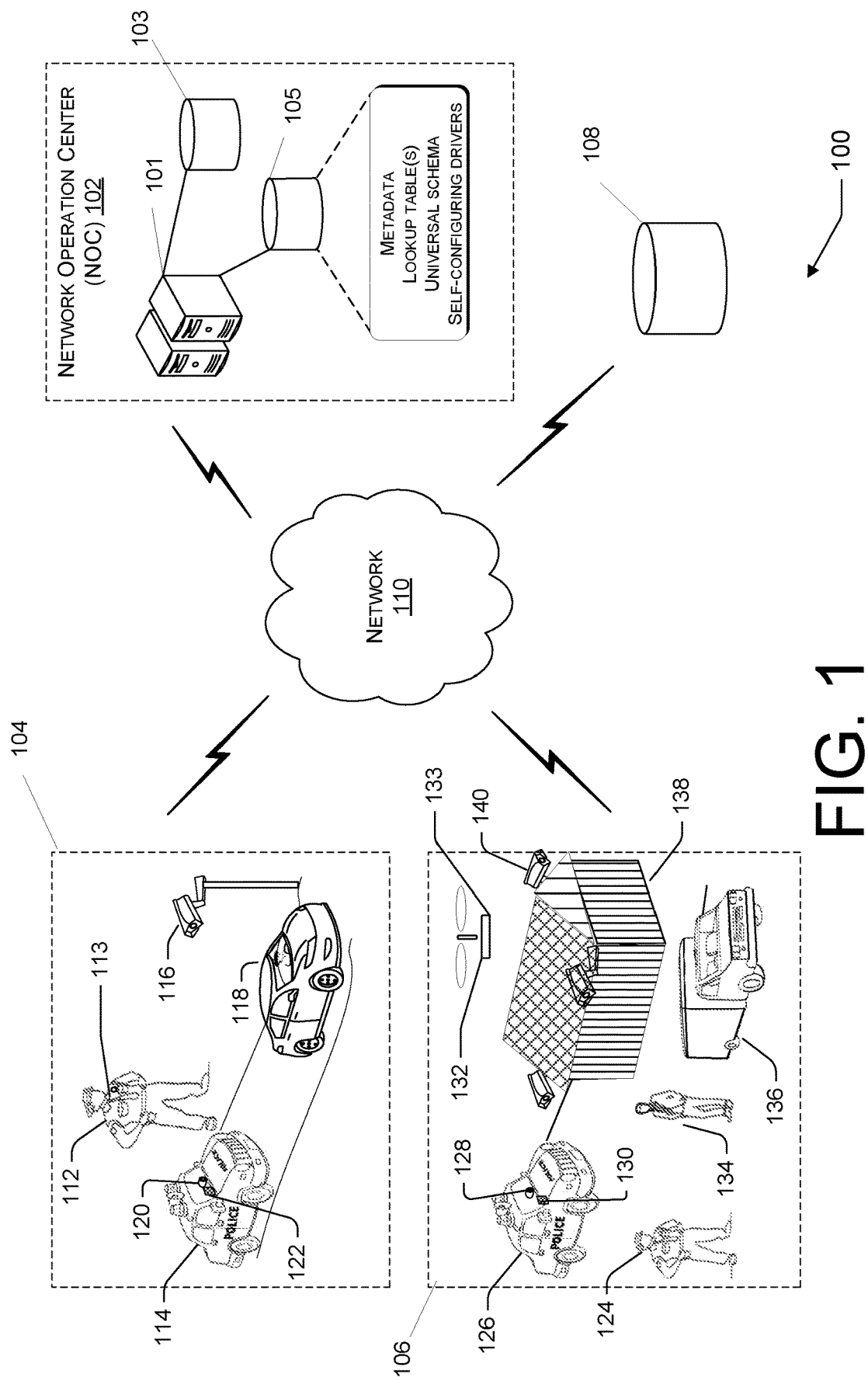
FIG. 1 illustrates an example of systems and processes in an environment for configuring heterogenous data sources uniformly using the principle of driver self-configuration.

This disclosure is directed to techniques for a data aggregation implementation that includes self-configuring drivers. From the viewpoint of a Network Operation Center (NOC), a plurality of heterogenous content sources such as cameras, microphones, official records, and the like may stream content and/or provide content on a regular or periodic basis, or in response to an event or on demand, and such content may be of a variety of different types and formats. All of this content must be ingested and stored for retrieval and reporting, analysis, and/or presentation in an efficient manner despite many differences in their collection, format, transmission, and quality, among others. Sometimes the content originates from the same scenario and may be delivered in real time or substantially real time; sometimes the content is provided or retrieved separately from the scenario but utilized to inform the scenario and lessons to be learned from it, and/or to make predictions and/or recommendations for future scenarios and decisionmaking. The NOC has the ability to not only manage multiple scenarios at the same time, but also manage multiple aspects of the same scenario, improving the user experience as well as predictions and recommendations. Development of the platform and its features enable new use cases as well.

Unless otherwise suggested, content may include audio (e.g., voice, music, background), image (e.g., still photos or video), other types of sensor input (heat, moisture, orientation, motion), documentary (e.g., structured or unstructured records, notes, graphs), and more. Audio, video, and other sensor or sensor-like content is commonly provided to the NOC wirelessly, although content can be sent via wired communication or a combination of wired and wireless communication. In some instances content can also be uploaded from a physical device, e.g., an external drive or a computing device via a wired connection or a physical dock. Other types of content, such as official records or documents, may be in paper form and require scanning or manual entry. Content may also be provided. and/or retrieved from databases or other electronic or enterprise storage. In many cases, content may refer to data and its metadata, or simply to the data itself.

Generally speaking, metadata is data that describes other types of data, such as content. Describing photographic content, metadata may include the date and time of image capture, image resolution, file name, and file type, for example. Metadata of video streams may also include these examples as well as bit rate, start and stop times, etc. Video accompanied by audio, or audio alone, may be described by audio level, bit rate, or compression type. Metadata of documents may include the names of authors or editors, number of pages or records, etc. Other metadata may include location, an event identifier, names of subjects or participants, or data source. Many of these may apply to more than one type of content.

Content sources may obtain content at different types of locations and in different scenarios. Examples may include security cameras in buildings or other protected sites, body-worn cameras (BWCs) commonly used by law enforcement officers, still photographic cameras in a photo studio or outdoor event. listening devices in an uninhabited or unmanned environment, microphones at a speech or concert, temperature and moisture sensors for indoor storage, and the like. Other examples may include structured or unstructured documents from a database or paper records. Content may be created and/or transmitted or otherwise provided in real time or substantially real time, periodically, at irregular intervals, or on demand.

Law enforcement agencies rely on content for everything from determining whether and how to investigate a situation to monitoring the investigation to reporting and analyzing results of the investigation. Content may be provided to officers and agents from an assortment of devices—electronic and otherwise—to carry out their duties. Such devices may include personnel-issued radios (in-vehicle and portable), BWCs, weapons (guns, Tasers, clubs, etc.), portable computers, and the like. In addition, vehicles such as cars, motorcycles, drones, bicycles, etc., may be equipped with electronic devices associated with the vehicle, such as cameras, sirens, beacon lights, spotlights, personal computers, etc. In some instances, content obtained in advance may be analyzed to determine the advisability of entering a particular location or scene in pursuit of the investigation. Content obtained at the scene may be transmitted and monitored to ensure the safety of personnel or gather evidence. Content obtained after the investigation or part thereof may be used to prepare reports or to be incorporated with content obtained at the scene for analysis and decisionmaking. Machine learning may assist in the analysis and decisionmaking.

Such a variety of content and content sources is not limited to the law enforcement scenario. First responders to an emergency may rely on heat sensors, weather reports, infrared cameras, oxygen sensors, and the like to ensure their safety and guide their efforts. Medical personnel may rely on temperature sensors, oxygen sensors, x-ray images, radiation detectors, patient reports, and the like to inform their patient care decisionmaking. Retail establishments may employ security cameras, entry sensors, motion trackers, inventory records, and purchase records to inform product placement, inventory management, even employee scheduling. However, for the purposes of illustration, this description will mainly refer to law enforcement scenarios. No limitation as to the applicability of the various techniques described herein to other scenarios, whether law enforcement or otherwise, is intended or should be inferred except where indicated or clear from the context.

In an example network environment, the heterogenous sensors and cameras are deployed, for example, for crime prevention or for the collection of data that may be used as evidence in a court proceeding or other purpose. For different scenarios, locations, and conditions, different types and amounts of data may be collected at the scene and transmitted for real time or near real time consumption at the NOC or transmitted or uploaded to the NOC later. In some examples, other relevant content may be created, produced, or provided before or after the described data collection at the scene.

For example, in a traffic violation scenario, an officer may pull over a speeding car. Before leaving the police vehicle to address the driver, the office may activate a dashboard camera to begin video capture of the scene before the vehicle, perhaps including the license plate in the field of view. The license plate number may be captured and transmitted in real time to a field computing unit in the police car as well as to the NOC as the officer approaches the driver and activates her BWC, which may have both video and audio transmission or storage capability. Activation of the BWC may automatically notify the NOC that a stop has been initiated. In the meantime, a device in the police vehicle or borne by the officer (such as the BWC) may detect the GPS coordinates of the stop and transmit the same to the field communicating device and to the NOC. After scanning the driver's license, and making sure that the driver's face is in the BWC's field of view, the officer may obtain the driver's signature on paper or electronically on a tablet. Both the image of the driver's license and the image of the driver's face may be stored on the BWC, transmitted to the field computing unit, and/or transmitted to the NOC. Upon returning to her vehicle, the officer may make an oral report to the NOC or type the same into the field computing unit. If typed into the field computing unit, the report may be immediately transmitted to the NOC. In some embodiments, the report may be uploaded from the field computing unit upon the officer's return to the station via a NOC, either via wire, wirelessly, an external storage device, or by mounting the field computing unit to a dock on checking in.

The notification of the stop may be a simple radio signal but may include a request/response communication including transmission of incident-related data such as a recording of the officer's voice or time- and location-related data. Images of the license plate and surroundings captured by the vehicle camera may be of one file type and resolution, and in color. Images taken by the BWC may be video or resolution, in color or black-and-white, and be accompanied by audio. The driver's paper signature is generally unstructured content although it may be made in a specified location on the paper that is recognized by a scanner on the basis of its location. The electronic signature may be stored as an image file on the tablet. The driver's license may be scanned and also stored on the tablet. The oral report may be in the form of an audio recording sent separately or with the textual report and/or associated images. If typed, the report may be sent as a text file. Information stored on the tablet or field computing unit may be uploaded upon return to the police station, NOC, or other check-in location. Some of these files and transmissions may be of the same type but some are likely to be of different types with different metadata at different locations in the particular format of each individual device. Even some devices that send files of the same type may use different metadata and use different respective formats. In accordance with techniques described herein, the NOC is able to recognize the various types and formats, transform the metadata to a format according to a universal schema, and enable drivers to self-configure in accordance with the resulting format.

In some embodiments, the NOC includes or cooperates with one or more servers to, among other functions, receive content from content sources, request object reflection by the driver of each content source, receive driver attributes in response, and map the metadata of the content for each content source to a universal schema, thereby self-configuring the driver. New content sources (sources that have not previously provided content) and new drivers may be handled in a similar fashion. Subsequent content received from the self-configured content sources will conform to the universal schema.

In some embodiments, a self-configured driver for one content source can be copied to each other content source of the same format (for example, content sources of the same manufacturer and model), or the same command to self-configure can be sent to the drivers of all such content sources simultaneously. Similarly, subsequent changes to the attributes or universal schema can be sent to one content source and copied to the drivers of similar content sources or propagated to the drivers of all such content sources simultaneously.

Certain implementation and operations described herein may be ascribed to the use of one or more servers; however, alternative implementations may execute certain operations in conjunction with or wholly within a different element or component of the system(s). Further, the techniques described herein may be implemented in a number of contexts, and several example implementations and context are provided with reference to the following figures. The term "techniques," as used herein, may refer to system(s), method(s), computer-readable instruction(s), module(s)m algorithms, hardware logic, and/or operation(s) as permitted by the context described above and throughout the document.

FIG. 1 illustrates an example of systems and processes in an environment 100 for configuring heterogenous data sources uniformly using the principle of driver self-configuration. The example environment 100 may include a Network Operations Center (NOC) 102, a traffic stop scene 104, an investigation scene 106, a third-party content source 108, and a network 110.

The NOC 102 is generally a communication, command, and control system for the environment 100. The NOC 102 may be provided with various resources for the likes of managing content, controlling external content sources, communicating with personnel in the field and other external parties, and generally providing a command center populated by personal computing devices, monitors, servers, communications equipment, and humans who make use of all of the above. In at least one context, the NOC 102 may be part of a law enforcement agency or a facility that is operated by a third-party to offer services to the law enforcement agency. The NOC 102 may be used as a base from which personnel may monitor operations, gather and disseminate intelligence information, and control devices. For example, the NOC 102 may receive content from the traffic stop scene 104, the investigation scene 106, and third-party content sources 108, process the content as described herein, and in general communicate with and control personnel and devices at these and other locations.

The NOC 102 may include one or more servers 101, a content storage 103, and a data store 105. The server(s) 101 include one or more network servers configured with hardware, software, and/or firmware that perform one or more of ingesting content, processing and analyzing the content, making the analysis results available for consumption, and controlling personnel and apparatus in accordance with the results. The content storage 103 stores content, including content received from one or more of the content sources described herein. The data store 105 may store, for example, metadata associated with the content, one or more lookup tables, a universal schema, and self-configuring drivers, among other things. The content storage 103 and the data store 105 are not limited as far as the information stored therein. For example, content storage 103 and the data store 105 and information stored therein may be considered part of the same storage, and the content storage 103 and/or the data store 105 may be located in one or more locations external to the NOC 102 in some embodiments.

The traffic stop scene 104 features a police officer 112, a patrol unit 114, a security camera 116, and a stopped car 118. The police officer 112 has a BWC 113 attached to his uniform or another place on his person. The patrol unit 114 has a dashboard camera 120 and a field computing unit 122. The police officer 112 is representative of any law enforcement representative that might be present at a traffic stop. The patrol unit 114 is shown as a car but may be a truck, van, motorcycle, or other vehicle suited for the scene.

The BWC 113, the security camera 116, and/or the dashboard camera 120 may include respective identification (ID) modules that identify themselves to the NOC 102. One or more of these cameras may capture audio and/or video and transmit the captured audio and/or video content to the NOC 102. Additionally or alternatively, one or more of these cameras may be configured to communicate with the field computing unit 122 via a physical connection (e.g., a physical connector or wires), or via a wireless communication protocol, such as Bluetooth, BLE, WiFi, cellular, etc.

The BWC 113, the security camera 116, and/or the dashboard camera 120 also may include, respectively, an input interface that includes physical buttons, a gesture recognition mechanism, a voice activation mechanism, and/or the like. Through such an input interface, these cameras can be manually activated by a user (e.g., a law enforcement officer) to start or stop recording data, communicate with connected devices, etc.

Although the security camera 116 is shown as mounted on a fixed pole, in other examples the security camera 116 may be mounted to any other fixed object, such as a building, or it may be mounted to a mobile object. Similarly, the dashboard camera 120 is representative of any suitable imaging unit and its location need not be limited to the dashboard.

The field computing unit 122 can include a type of computer commonly referred to as a personal computer, or it may be a specialized computer designed to operate within specialized parameters of a law enforcement role. The field computing unit 122 may be a portable unit, optionally configured to be mounted to a dock or other support (not shown) within the patrol unit 104, at the NOC 102, at a location where the unit may be checked in or checked out by the officer 112, or any other suitable place. In some examples, the field computing unit 122 and the dock may have mating connectors that facilitate power charging and/or uploading or downloading of content, data, programs, applications, updates, etc. It is representative of any computing unit that may be used to enter, store, receive, transmit, or otherwise support the collection of information at the scene and provide the same to the NOC 102. The field computing unit 122 may form part of a computer-assisted dispatch system, in particular one centered at the NOC 102, similar to those commonly in use by law enforcement agencies, and typically includes an audio/video recording function or a digital video recorder (DVR).

The investigation scene 106 features a police officer 124, a patrol unit 126, a dashboard camera 128, a field computing unit 130, a drone 132, a subject 134, a truck 136, a building 138, and security cameras 140. The police officer 124, the patrol unit 126, the dashboard camera 128, the field computing unit 130, and the security cameras 140 are representative figures and may be similar to those described above with respect to similar features of the traffic stop scene 104. The drone 132 represents any aerial vehicle that may be used to collect images, audio, and the like from a scene, and to this end has a camera 133 capable of recording image and video content. The subject 134 is representative of a person who may be a suspect, a witness, a passerby, or the like. The truck 136 represents a general vehicle that may be relevant to the investigation. The building 138 likewise represents a general building that may be relevant to the investigation.

The traffic stop scene 104 and the investigation 106 are representative of different types of scenarios. Different scenarios may produce different content and considerations related to the collection of content. The type, quantity, and quality of content from disparate scenarios feed advantages and benefits achievable by the NOC 102, notably in the managing of metadata as described herein.

The third-party content source 108 may represent one or more sources of content received or retrieved by the NOC 102 from an entity beyond the immediate control of the NOC 102. For example, the third-party content source 108 may be a source of data that is relevant for the scene, such as statistics with respect to population, neighborhood data, and/or crime data of the area of where the scene is taking place; background information on the subject 134; or on the position of additional law officers or other emergency services. Examples of third-party content sources 108 may include, without limitation, a records department of a municipal entity as a source of city or state vital records, a research organization as a source of demographics or socioeconomic data, or a school system as a source of student or personnel records, to name but a few. Third-party content may include municipal records, crime data, demographics, civic activism, community service, etc.

The network 110 may represent one or more wireless and/or wired communication networks, including but not limited to cellular networks, the Internet, and/or other public and private networks, including LANs, WANs, VPNs, and/or other networks internal to the NOC 102.

Figure 2:
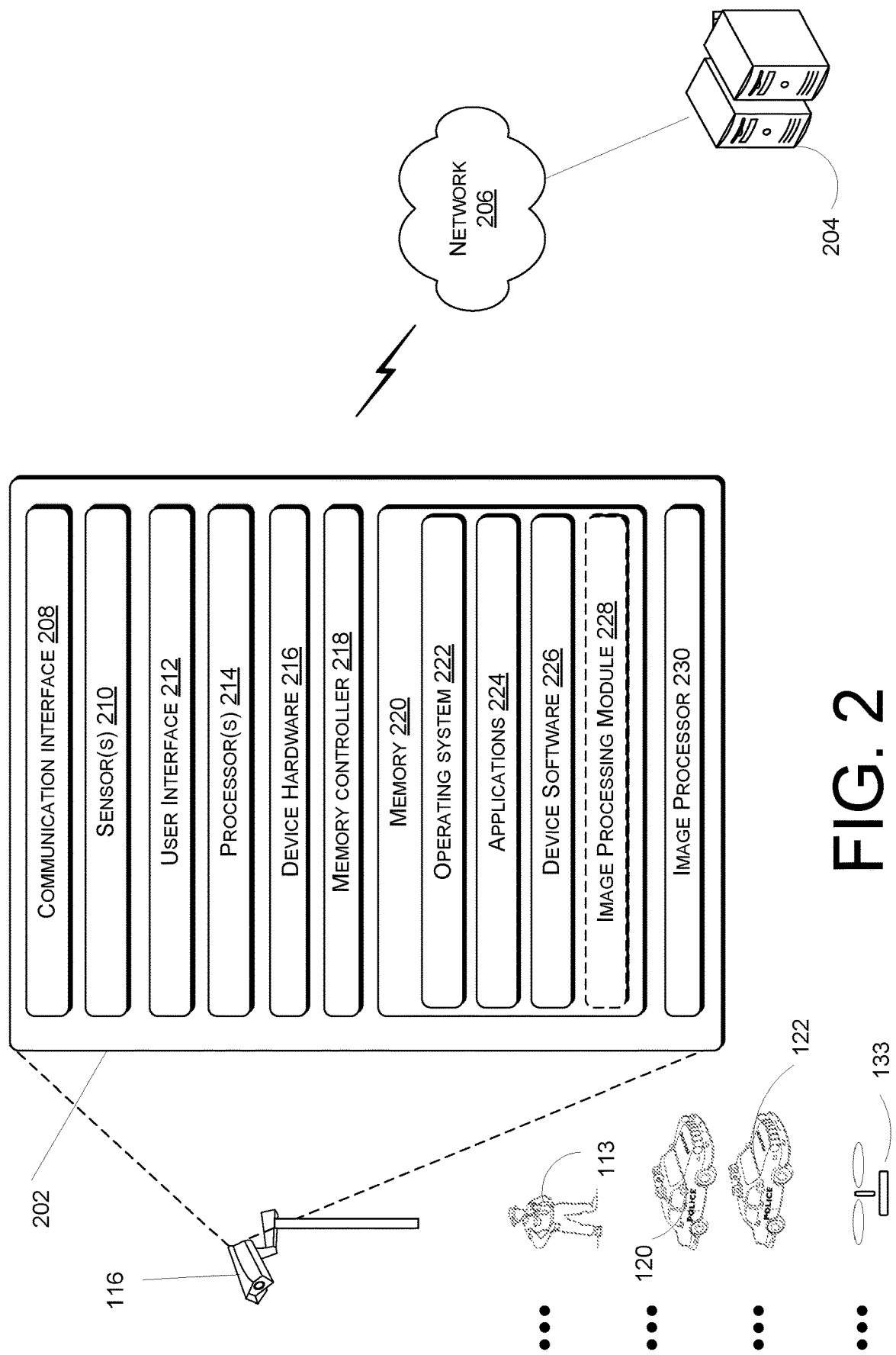
FIG. 2 illustrates various components of a content source that is communicatively coupled to the NOC.

FIG. 2 illustrates various components of a content source 202 that are communicatively coupled to the NOC 102. The content source 202 may correspond to one or more of the security camera 116, the BWC 113, the dashboard camera 120, the field communication device 122 (including a camera or microphone thereon), or the drone camera 133, for example. In the illustrated example, the content source 202 may be configured to capture, send, and/or store content. The content source 202 may receive, from the NOC 102, control commands to perform various other functions.

As illustrated in FIG. 2, the content source 202 may be communicatively coupled to one or more servers 204 corresponding to the one or more servers 101 of the NOC 102 via one or more networks 206 corresponding to the network 110. In some embodiments, the content source 202 may include one or more of a communication interface 208, one or more sensors 210, a user interface 212, one or more processors 214, device hardware 216, a memory controller 218, memory 220, and, in imaging devices, an image processor 230.

The communication interface 208 may include wireless and/or wired communication components that enable the content source 202 to transmit data to and receive data from other networked devices via a communication network such as the network 206.

The sensor(s) 210 may be configured to capture content that reflects an environment proximate to the content source 202. The sensor(s) 210 may include a GPS sensor to determine a geolocation of the content source 202, a microphone to capture audio data, a camera to capture image and video data, and/or other sensors to detect motion, temperature, heat, moisture, vehicle speed, air speed, etc. The sensor(s) 210, such as found within the BWC 113 or on the field computing device 122, for example, may further include biometric sensors configured to capture biometric data associated with an individual such as the officer 112. Biometric sensors may include a heart sensor configured to detect pulse waves for variability in beat-to-beat intervals.

The user interface 212 may enable a user such as the officer 112 or another user to provide input and receive output from the content source 202, including, for example, providing one or more input to initiate device activation and/or set metadata, tags, communication parameters, etc. The user interface 212 may include a data output device (e.g., visual display, audio speakers), and one or more data input devices. The data input devices may include, but are not limited to, combinations of one or more of touch screens, physical buttons, cameras, fingerprint readers, keypads, keyboards, mouse devices, microphones, speech recognition packages, and any other suitable devices or other electronic/software selection methods.

The processor(s) 214 and the memory 220 may implement the operating system 222. The operating system 222 may include components that enable the content source 202 to receive and transmit data via various interfaces (e.g., the user interface 212, the communication interface 208, and/or memory input/output devices), as well as process data using the processor(s) 214 to generate output. The operating system 222 may include a display component that presents output (e.g., display data on an electronic display, store the data in memory, transmit the data to another electronic device, etc.). Additionally, the operating system 222 may include other components that perform various additional functions generally associated with an operating system.

The device hardware 216 may include additional hardware that facilitates performance of the user interface 212, data display, data communication, data storage, and/or other device functions.

The memory controller 218 may include hardware, software, or a combination thereof, that enables the memory 220 to interact with the communication interface 208, processor(s) 214, and other components of the content source 202. For example, the memory controller 218 may receive content from the communication interface 208 and send the received content to the content storage 103 and its metadata to the data store 105 under control of the processor(s) 214. In another example, the memory controller 218 may retrieve instructions from memory 220 for execution by the processor(s) 214.

The memory 220 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, Random-Access Memory (RAM), Dynamic Random-Access Memory (DRAM), Read-Only Memory (ROM), Electrically Erasable Programable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Computer readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanism.

The memory may include the operating system 222, one or more applications 224, device software 226, and, in image capturing devices such as the security camera 116, the dashboard camera 120, the field computing device 122 camera, and/or the drone camera 133, an image processing module 228. The application(s) 224 may include any application software executable by processors on the content source 202, including but not limited to applications that facilitate image capture, manipulation, and formatting; addition, deletion, or modification of metadata, retrieval and transmission of attributes, and image processing by the image processing module 228 in general, for example.

The device software 226 may include software components that enable the content source 202 to perform functions. For example, the device software 226 may include a basic input/output system (BIOS), Boot ROM, or bootloader that boots up the content source 202 and executes the operating system 214 following power up of the content source.

The image processing module 228 may include software executed by the image processor 230 to process images captured by imaging devices corresponding to the content source 202. For example, the image processor 230 and image processing module 228 may implement techniques for improving the quality of captured images (e.g., image sharpening, red eye reduction, pixel interpolation) as well as compression, filtering, etc.

Figure 3:
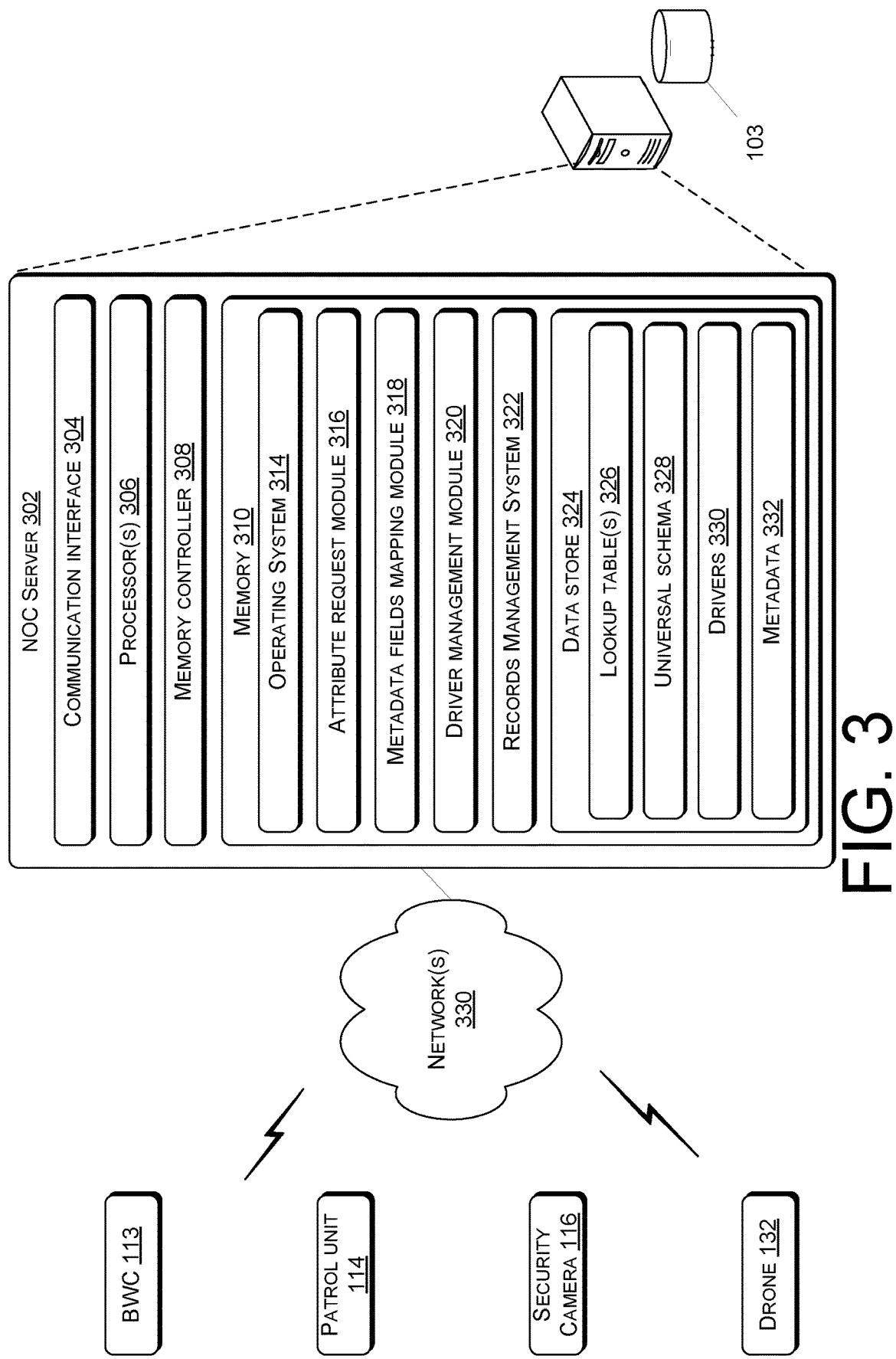
FIG. 3 illustrates an example NOC server in accordance with the technologies described herein.

FIG. 3 illustrates an example NOC server 302 in accordance with the technologies described herein. In some embodiments, the NOC 102 may include or cooperate with one or more servers 302 that are configured with hardware, software, and/or firmware to, among other functions, receive content from content sources, request object reflection by the driver of each content source, receive driver attributes in response, map the metadata of the content for each content source to conform to a universal schema, thereby self-configuring the driver, and store the content in association with its metadata according to the universal schema. New content sources (sources that have not previously provided content) and new drivers may be handled in a similar fashion. Subsequent content received from the self-configured content sources will conform to the universal schema. The NOC server 302 may correspond to the one or more servers 101 of FIG. 1, and may include a communication interface 304, one or more processors 306, a memory controller 308, and memory 310. The NOC server 302 has several components (e.g., the communication interface 304, the processor(s) 306, and the memory controller 308) that function similarly to the correspondingly named components of the content source 202 depicted in FIG. 2. Other components, including a user interface and server hardware, also are present and correspond to the user interface 212 and device hardware 216 of FIG. 2. For clarity, those components are not shown in FIG. 3.

The processor(s) 306 and the memory 310 may implement the operating system 314. The operating system 314 may include components that enable the NOC server 302 to receive and transmit data via various interfaces, as well as process data using the processor(s) 306 to generate output. The operating system 314 may include a display component that presents output (e.g., display data on an electronic display, store the data in memory, transmit the data to another electronic device, etc.). Additionally, the operating system 314 may include other components that perform various additional functions generally associated with an operating system.

The memory controller 308 may include hardware, software, or a combination thereof, that enables the memory 310 to interact with the communication interface 304, processor(s) 306, and other components of the NOC server 302. For example, the memory controller 308 may receive content from the communication interface 304 and send the received content to the content storage 103 and its metadata to a data store 324 under control of the processor(s) 306. In another example, the memory controller 308 may retrieve instructions from memory 310 for execution by the processor(s) 306.

The memory 310 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, Random-Access Memory (RAM), Dynamic Random-Access Memory (DRAM), Read-Only Memory (ROM), Electrically Erasable Programable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Computer readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanism.

The memory 310 may include the operating system 314, an attribute request module 316, a metadata fields mapping module 318, a driver management module 320, a records management system 322, and the data store 324. The data store 324 may be partially or wholly a separate storage and may be disaggregated or singular. The memory 310 also stores components such as server applications and server software corresponding to the applications 224 and device software 226 of the content source 202 shown in FIG. 2. For clarity, those components are not shown in FIG. 3.

The attribute request module 316 may request attributes of the drivers of the content sources 202. The drivers obtain their attributes by a technique known as object reflection. In various object-oriented programming languages, attributes take arguments such as methods and properties, and in particular may refer to metadata and metadata fields associated with data. Reflection relates to the ability of the driver, to examine, modify, and return values, metadata, properties, and functions of an object at runtime. Using reflection, one can learn the attributes of the driver and thus the metadata and metadata fields associated with the content produced by the content source. Indeed, reflection enables an application to examine its own metadata or even that of other applications.

The attribute request module 316 is configured of software that, when executed by, e.g., the processor(s) 306, transmits a request to the driver(s) of one or more of the content sources 202 for object attribute information on at least one software object associated with the driver. Obtaining the attributes in return, the metadata and its properties, together with the metadata fields and their formats, can be ascertained so as to map them to a universal schema.

The metadata fields mapping module 318 may be software configured to run on hardware such as the processor(s) 306 to map the metadata fields of incoming content to a universal schema 328 and store the same, thereby self-configuring the driver. Describing image content, including photographic and video content, metadata may include the date and time of image capture, image resolution, file name, file type, bit rate, start and stop times, etc. Video accompanied by audio, or audio alone, may be described by audio level, bit rate, or compression type. Metadata of documents may include the names of authors or editors, number of pages or records, etc. Other metadata may include location, an event identifier, names of subjects or participants, or data source. Many of these may apply to more than one type of content.

In general, almost all content is accompanied by metadata that describes that content. However, not all content has the same metadata, which may be dependent on the user, the content source that captures the content, the device driver, etc. When content arrives at the NOC 102, the content is stored in the content storage 103 typically with its metadata associated with it in one or more databases in the data store 324. Metadata associated with various content and having various formats (order of arrival), descriptions (language, symbols, units), bit numbers, etc. do not readily conform to storage as data records without some kind of manipulation. Manual adjustment of the metadata, in particular, is tedious and error-prone. The metadata fields mapping module 318 is configured to map the various metadata fields to a universal schema so that the content is stored with its associated metadata arranged consistently with other metadata, at least of the same content type.

The driver management module 320 may include software that, upon execution by, e.g., the processor(s) 306, may resolve issues with values stored in the metadata fields. For example, in some embodiments, the returned attributes include at least one field for which no value can be returned. In such a case, the driver configuration information may include a default value for those fields. In some instances, the driver management module 320 may include a value to override the default value in the new driver (self-)configuration information.

Advantages brought by self-configuring drivers further include but are not limited to an enhanced efficiency in configuring drivers of multiple, like content sources 202 and weeding out defective content sources 202. For example, the metadata fields mapping module 318 may identify multiple security cameras of the same manufacturer and model. Assuming that all of these cameras would use the same driver, only one need self-configure. The self-configured driver may then be copied to all of the other like cameras. Likewise, if the attributes of one of the like cameras differs from the rest, it can be assumed that content received from the odd camera may be processed incorrectly; that camera may then be taken offline and its content discarded. These functions may be carried out in whole or in part by one or more other modules as well.

The records management system (RMS) 322 may include software that, among other things, enforces rules relating to the creation, retention, sharing, and disposition of records. Managed records may include any content received from the content sources 202 as well as content received from the third-party content sources 108. In particular (but without limitation), sensitive information obtained from the third-party content sources 108 may be confidential, unpublished, or transient data, for example, that may be of particular sensitivity (such as juvenile criminal records), interim reports relating to ongoing undercover investigations, or data relating to the spread of a virus or distribution activities of a drug supplier. The RMS 322 may designate, in metadata and enforced in the universal schema, access rights, non-publish status, or an expiration date for retaining such records, for example. In this regard, tagging certain files, in or in addition to the attributes, may permit the RMS 322 to trace the origin of content and/or related data. Tagging allows the RMS 322 to track the flow of a resource such as content throughout the workflow. Tracking facilitates reporting and auditing for content integrity, proof of chain-of-custody, management oversight, and regulatory compliance, among other benefits.

In some embodiments, the RMS 322 may contribute to an overall command strategy implemented by the NOC server 302. For instance, the RMS may implement a database structure, for example a relational database, that correlates the data records for the various files input from the data sources. Although illustrated here functionally as a unit that may suggest implementation as a store that may suggest to some a singular unit and/or center, the database managed by the RMS 322 may be disaggregated in datacenters in multiple locations; however, the RMS 322 may reside functionally within the overall environment of the NOC 102, whereas some elements of the RMS 322 and/or its workflow may themselves be disaggregated.

The data store 324 may store one or more lookup tables 326, a universal schema 328, drivers 330 for the content sources 202, and metadata 332 associated with content received from the content sources 202 and the third-party sources 108. At least the lookup table(s) 326, drivers 330, and metadata 332 may be stored in one or more databases that correlate various content, data, and metadata. In some embodiments, one or more of the databases may be relational databases, although no limitation is intended or should be inferred. The data store 324 may be contained within the NOC server 302, separately but at least partially within the NOC 102, or externally of the NOC 102. All or part of the data store 324 may be disaggregated.

The universal schema 328 is at least part of the objective of metadata mapping. As described elsewhere herein, the universal schema 328 may represent one schema for which the attributes of all drivers (more specifically, the metadata fields) will conform. Using a universal schema improves database storage of data records corresponding to the stored content, and according to the retrieval of stored content, examination of its metadata, and the integrity of its management.

The drivers 330 are software that communicate with the operating system 314 to send and receive information, including receiving content, from the content sources 202 and the like. The drivers 330 may be programmed with an object-oriented programming language that supports objects having attributes. As described elsewhere herein, by object reflection, the drivers 330 may send their attributes to the metadata fields mapping module 318 in response to a request from the attribute request module 316.

The metadata 332 is data that describes associated content received from the content sources 202, the field computing device 122, the third-party sources 108, and the like. Examples are described elsewhere herein. The metadata 332 may be stored in one or more data records having respective fields of metadata describing, e.g., packetized data (content) corresponding to the respective data record. In accordance with techniques described herein, the received attributes may be mapped to corresponding fields in the universal schema such that the data received corresponding to each field is configured to be stored to its respective corresponding field, thereby self-configuring the driver by the replacement schema. In some embodiments, the mapping of the received attribute information to corresponding fields in the universal schema 328 is based at least on one or more lookup tables 326 that, among other things, may indicate likely synonyms or substitutions of field attributes of objects from the driver to the fields in the universal schema 328. The one or more lookup tables 326 may constitute or be a universal lookup table based at least on data provided by the driver vendor. The universal lookup table may be generated from a machine learning algorithm based on prior successful mappings, for example.

Figure 4:
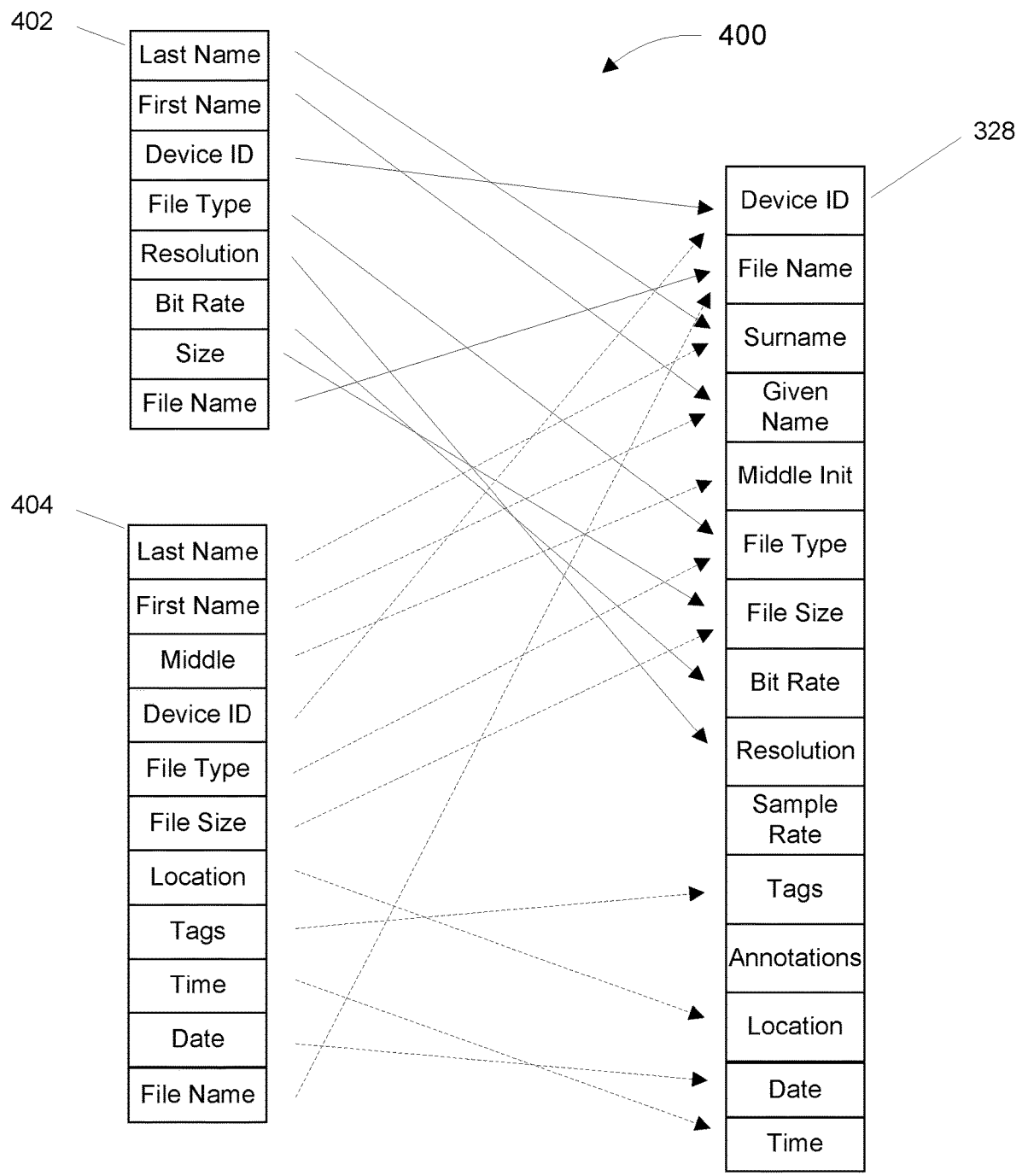
FIG. 4 illustrates an example mapping of object attributes to a universal schema.

FIG. 4 illustrates an example mapping 400 of object attributes 402 and 404 to a universal schema 328. The mapping 400 by the metadata fields mapping module 318 maps attributes to the universal schema 328 according to metadata fields and stores the metadata in the metadata storage 332.

In FIG. 4, the attributes 402 from a first driver may include the eight metadata fields named Last Name, First Name, Device ID, Film Type, Resolution, Speed, Bit Rate, and File Name in that order. The universal schema 328 has the 15 field names Device ID through Time as shown. Notably, although some fields in the received metadata (e.g., Last Name, First Name, Size) have correspondence in the universal schema, those corresponding fields in the universal schema 328 are named differently (e.g., Surname, Given Name, File Size). The mapping may have been made manually, originally, and is now incorporated in the lookup table(s) 326. Alternatively, or additionally, such mappings incorporated in a machine learning model may appear in the lookup table(s) based on a volume of incoming metadata. Regardless, the metadata fields mapping module 318 is able to map Last Name to Surname in the third position in the universal schema 328, First Name to Given Name in the fourth position, Device ID to Device ID in the first position, File Type to File Type in the sixth position, Resolution to Resolution in the ninth position, Size to File Size in the seventh position, and File Name to File Name in the second position. That is, the eight attributes 402 map to positions 1-4 and 6-9. Positions 5 and 10-15 will have a null value in the schema that configures the corresponding driver 330.

Similarly, the attributes 404 from a second driver may include the 11 metadata fields Last Name through File Name as shown. The universal schema 328 has the 15 field names Device ID through Time as shown. The metadata fields mapping module 318 is able to map Last Name to Surname in the third position in the universal schema 328, First Name to Given Name in the fourth position, Middle to Middle Init in the fifth position, Device ID to Device ID in the first position, File Type to File Type in the sixth position, File Size to File Size in the seventh position, Location to Location in the 13th position, Tags to Tags in the 11th position, Time to Time in the 15th position, Date to Date in the 14th position, and File Name to File Name in the second position. That is, the 11 attributes 404 map to positions 1-7, 11, and 13-15. Positions 8-10 and 12 will have a null value in the schema that configures the corresponding driver 330.

Figure 5:
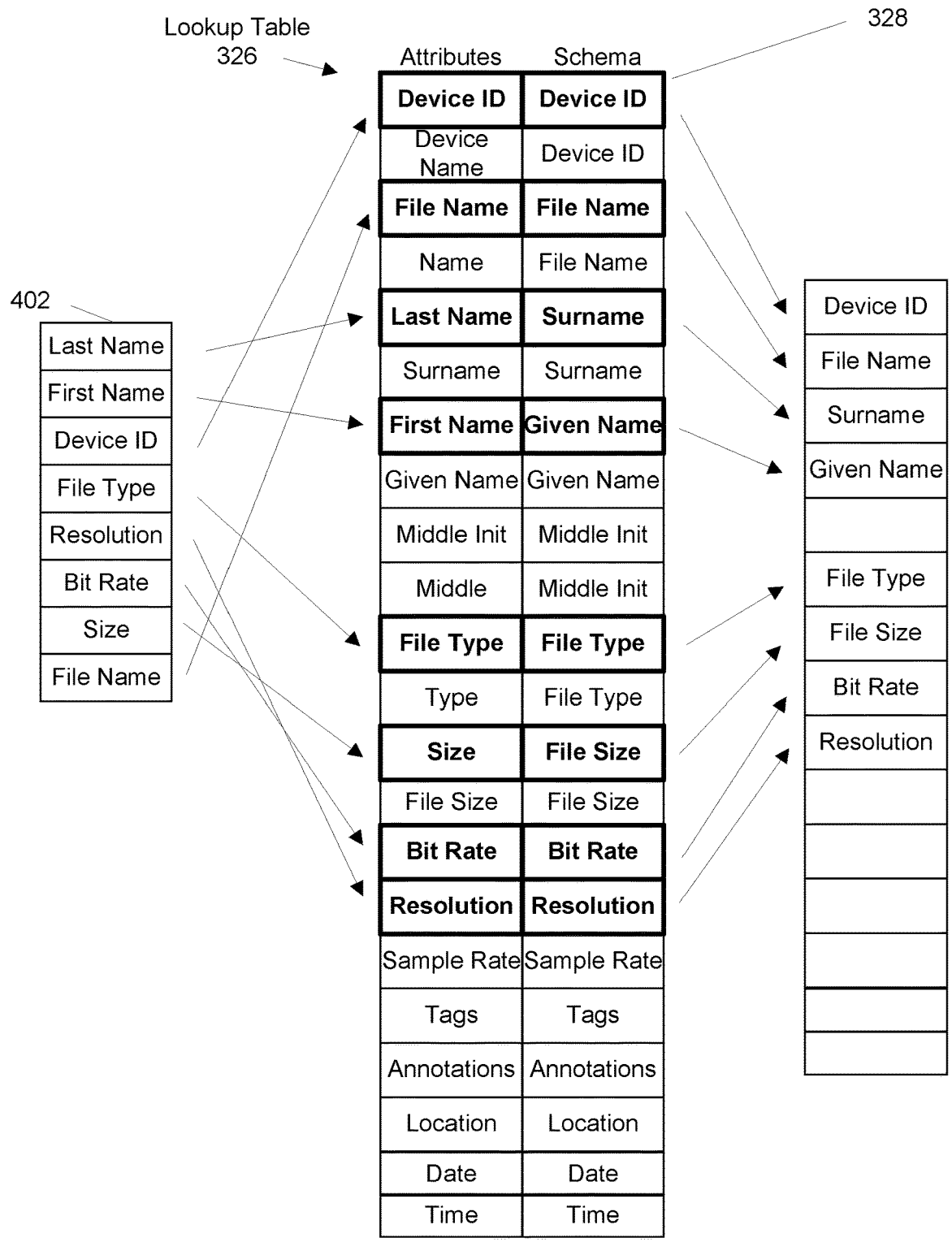
FIG. 5 illustrates an example lookup table for mapping attributes from a first driver to the universal schema.

FIG. 5 illustrates an example lookup table for mapping attributes 402 from a first driver to the universal schema 328. The mapping corresponds to the mapping of the first driver shown in FIG. 4. The lookup table 326 includes a composite of attributes that map to the universal schema 328. The bolded blocks show the attributes 402 of the first driver and their mapping to the universal schema 328. The resulting fields in the schema are shown at the right. These configure the corresponding driver.

Figure 6:
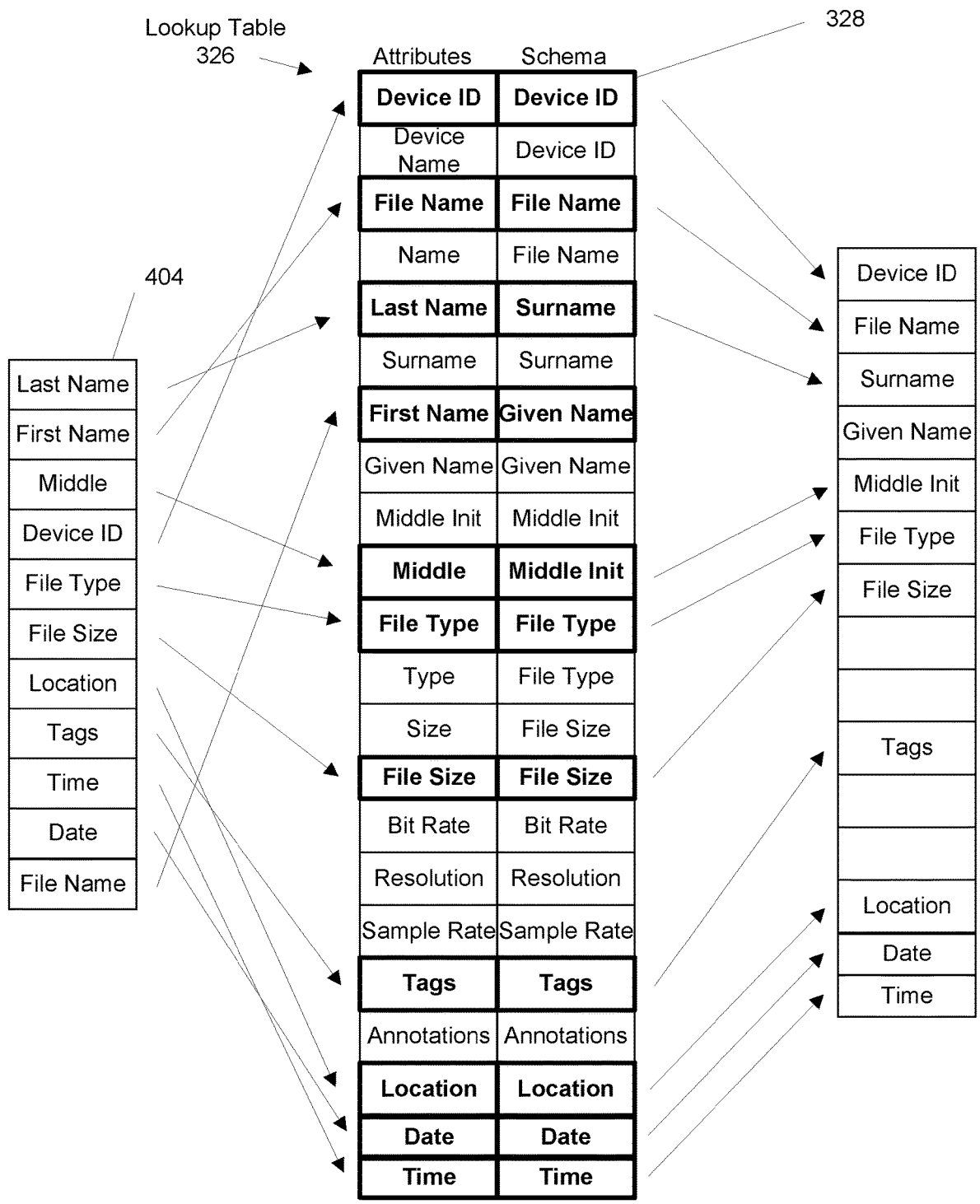
FIG. 6 illustrates an example lookup table for mapping attributes from a second driver to the universal schema.

FIG. 6 illustrates an example lookup table for mapping attributes 404 from a second driver to the universal schema 328. The mapping corresponds to the mapping of the second driver shown in FIG. 4. The lookup table 326 includes a composite of attributes that map to the universal schema 328. The bolded blocks show the attributes 404 of the second driver and their mapping to the universal schema 328. The resulting fields in the schema are shown at the right. These configure the corresponding driver.

Figure 7:
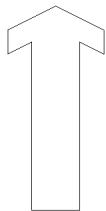
FIG. 7 illustrates examples of formatting two sets of driver attributes to the universal schema.
Figure 7:
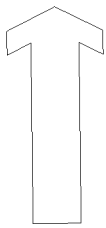

FIG. 7 illustrates examples of formatting two sets of the driver attributes 702 and 704 to the universal schema 328. FIG. 7 shows the transformations of FIGS. 5 and 6 without the lookup table 326, for clarity. The empty or null fields are easily seen. These resulting schema configure the first and second drivers, respectively.

In some embodiments, the metadata mappings may be stored in the metadata storage 332. Versioning the metadata and mappings makes possible their use in machine learning modeling, for example to predict mappings based on similarities of devices or circumstances. For example, data from security cameras of various models but from the same manufacturer may be used to train an ML model and the resulting model used to create better drivers. If poor results are shown, the metadata and/or mappings may be rolled back to a previous, more useful driver.

In some embodiments, a self-configured driver for one content source can be copied to each other content source of the same format (for example, content sources of the same manufacturer and model), or the same command to self-configure can be sent to the drivers of all such content sources simultaneously. Similarly, subsequent changes to the attributes or universal schema can be sent to one driver and copied to the drivers of similar content sources or propagated to the drivers of all such content sources simultaneously. In this regard, the content source itself can be tagged; tags are mappable so all devices of the same manufacturer/model can be tagged, and the tags associated with the metadata format.

Figure 8:
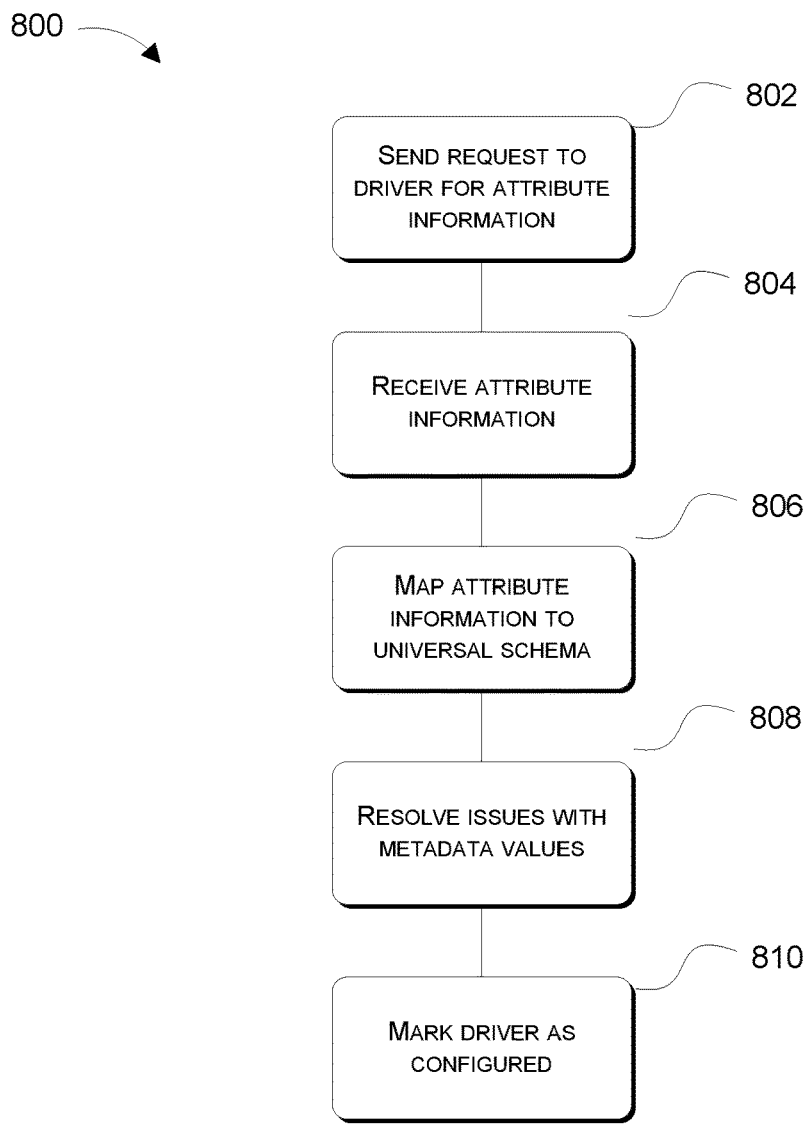
FIG. 8 is a flow diagram of an example process performed at least in part by the NOC server for requesting attributes from a device driver and mapping the attributes to a universal schema using one or more lookup tables.

FIG. 8 is a flow diagram of an example process 800 performed at least in part by the NOC server 302 for requesting attributes from a device driver 330 and mapping the attributes to a universal schema 328 using one or more lookup tables 326. The process 800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the environment 100 shown in FIG. 1.

At block 802, the attribute request module 316 may send a request to one of the drivers 330 to perform object reflection to obtain attribute information on at least one software object associated with the driver 330. Using reflection, one can learn the attributes of the driver and thus the metadata and metadata fields associated with the content produced by the content source. In some embodiments, the driver is one of the content sources described herein, e.g., the BWC 113, the security camera 116, the dashboard camera 120, the drone camera 133, etc.

At block 804, the NOC 102 and particularly the metadata fields mapping module 318 may receive the attribute information in accordance with the request. In various object-oriented programming languages, attributes take arguments such as methods and properties, and in particular may refer to metadata and metadata fields associated with data (content).

At block 806, the metadata fields mapping module 318 may map the received attribute information to corresponding fields in a universal schema such that data received corresponding to each attribute is configured to be stored to its respective corresponding field. In some embodiments, the mapping is implemented using one or more lookup tables 326, which map the attributes as metadata fields to the universal schema 328 thereby self-configuring the driver.

At block 808, the driver management module 320 may resolve issues with values stored in the metadata fields. For example, in some embodiments, the returned attributes include at least one field for which no value can be returned. In such a case, the driver configuration information may include a default value for those fields. In some instances, the driver management module 320 may include a value to override the default value in the new driver (self-)configuration information.

At block 810, the driver management module 320 may mark the driver 330 as configured. Accordingly, the driver 330 is ready to be implemented.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable storage media storing computer-executable instructions that, if executed by one or more processors, cause the one or more processors to perform acts comprising:
   sending a request to a driver to perform object reflection to obtain attribute information on at least one software object associated with the driver;
   receiving from the driver the attribute information obtained by the reflection in accordance with the request;
   mapping the received attribute information to corresponding fields in a schema such that data received corresponding to each attribute is configured to be stored to its respective corresponding field thereby self-configuring the driver,
   wherein the mapping of the received attribute information to corresponding fields in a schema is based at least on a lookup table indicating likely synonyms of field attributes of objects from the driver to the fields in the schema; and
   marking the driver as configured.

2. The one or more non-transitory computer-readable storage media of claim 1, wherein the driver is programmed with an object-oriented programming language that supports objects having attributes.

3. The one or more non-transitory computer-readable storage media of claim 1, wherein the lookup table is generated from a machine learning algorithm based on prior successful mappings.

4. The one or more non-transitory computer-readable storage media of claim 1, wherein the acts further comprise:
   receiving one or more data records from the driver; and
   storing the received one or more data records from the driver into the schema according to the mapping of the attributes to the fields in the schema.

5. The one or more non-transitory computer-readable storage media of claim 4, wherein the one or more data records have respective fields of metadata describing packetized data corresponding to the respective data record, and the metadata includes, for each of the one or more data records, a datatype, a name of each field, and a size of each field.

6. The one or more non-transitory computer-readable media of claim 5, wherein the acts further comprise streaming the packetized data,
   wherein the packetized data comprises sensor data configured from a single source, and the metadata includes time of data capture of the sensor data by the single source.

7. The one or more non-transitory computer-readable media of claim 5, wherein a returning of a driver configuration information includes returning a default value for a field having no data that can be returned.

8. The one or more non-transitory computer-readable media of claim 7, wherein the new driver configuration information includes a value to override the default value.

9. The one or more non-transitory computer-readable media of claim 1, wherein the acts further comprise:
   determining occurrence of an event;
   formatting metadata in one or more data records with a schema in accordance with the new driver configuration information; and
   outputting the formatted metadata in the one or more data records in response to the determining of the occurrence.

10. A computer-implemented method comprising:
    sending a request to a driver to perform object reflection to obtain attribute information on at least one software object associated with the driver;
    receiving from the driver the attribute information obtained by the reflection in accordance with the request;
    mapping the received attribute information to corresponding fields in a schema such that data received corresponding to each attribute is configured to be stored to its respective corresponding field thereby self-configuring the driver,
    wherein the mapping of the received attribute information to corresponding fields in a schema is based at least on a lookup table indicating likely synonyms of field attributes of objects from the driver to the fields in the schema; and
    marking the driver as configured.

11. The computer-implemented method of claim 10, wherein the driver is programmed with an object-oriented programming language that supports objects having attributes.

12. The computer-implemented method of claim 10, wherein the lookup table is generated from a machine learning algorithm based on prior successful mappings.

13. The computer-implemented method of claim 10, further comprising:
    receiving one or more data records from the driver; and
    storing the received one or more data records from the driver into the schema according to the mapping of the attributes to the fields in the schema.

14. The computer-implemented method of claim 13, wherein the one or more data records have respective fields of metadata describing packetized data corresponding to the respective data record, and the metadata includes, for each of the one or more data records, a datatype, a name of each field, and a size of each field.

15. The computer-implemented method of claim 13, wherein a returning of a driver configuration information includes returning a default value for a field having no data that can be returned.

16. The computer-implemented method of claim 15, wherein the new driver configuration information includes a value to override the default value.

17. A system, comprising:
    one or more processors; and
    memory storing one or more computer-readable instructions that, if executed by the one or more processors, cause the one or more processors to perform acts comprising:
    receiving, from a driver of a first content source, attribute information of the driver;
    mapping the received attribute information to corresponding fields in a schema such that data received corresponding to each attribute is configured to be stored to its respective corresponding field, wherein the mapping of the received attribute information to corresponding fields in a schema is based at least on a lookup table indicating likely synonyms of field attributes of objects from the driver to the fields in the schema; and self-configuring drivers.

18. The system of claim 17, wherein:

the schema defines respective fields of metadata describing packetized data corresponding to one or more data records, the metadata including, for each of the one or more data records, a datatype, a name of each field, and a size of each field.

19. The system of claim 17, wherein the acts further comprise:

modifying a driver configuration received from the driver of the first content source to fit the schema different from that of the driver configuration received from the driver of the first data source.

20. The system of claim 17, wherein the lookup table is generated from a machine learning algorithm based on prior successful mappings.

\* \* \* \* \*